(12) United States Patent
Alfano et al.

(10) Patent No.: US 9,939,332 B2
(45) Date of Patent: *Apr. 10, 2018

(54) DEVICE AND METHOD FOR TAKING MULTIPLE TEMPERATURE HVAC READINGS

(71) Applicant: Irwin Industrial Tool Company, Huntersville, NC (US)

(72) Inventors: Bryan Alfano, Manchester, CT (US); Joseph J. Houle, Westfield, MA (US)

(73) Assignee: Irwin Industrial Tool Company, Huntersville, NC (US)

( * ) Notice: Subject to any disclaimer, the term of this patent is extended or adjusted under 35 U.S.C. 154(b) by 938 days.

This patent is subject to a terminal disclaimer.

(21) Appl. No.: 14/268,005

(22) Filed: May 2, 2014

(65) Prior Publication Data

US 2014/0241395 A1 Aug. 28, 2014

Related U.S. Application Data

(63) Continuation of application No. 13/426,523, filed on Mar. 21, 2012, now Pat. No. 8,746,971.

(60) Provisional application No. 61/454,918, filed on Mar. 21, 2011.

(51) Int. Cl.
*G01K 7/00* (2006.01)
*G01K 1/00* (2006.01)
*G01K 13/00* (2006.01)
*G01K 1/14* (2006.01)

(52) U.S. Cl.
CPC ............ *G01K 13/00* (2013.01); *G01K 1/143* (2013.01); *G01K 2201/00* (2013.01)

(58) Field of Classification Search
USPC ............... 374/143, 141, 166, 179, 148, 208; 62/129; 73/37, 700
See application file for complete search history.

(56) References Cited

U.S. PATENT DOCUMENTS

| 4,909,041 | A | 3/1990 | Jones |
| D330,336 | S | 10/1992 | Baarman |
| 5,196,781 | A | 3/1993 | Jamieson et al. |

(Continued)

FOREIGN PATENT DOCUMENTS

| CA | 2107134 | 6/1999 |
| WO | 2002055965 A2 | 7/2002 |
| WO | 2011106011 A1 | 9/2011 |

OTHER PUBLICATIONS

International Search Report & Written Opinion for International Application No. PCT/US12/30009, dated Jun. 5, 2012.

(Continued)

*Primary Examiner* — Mirellys Jagan
(74) *Attorney, Agent, or Firm* — Eversheds Sutherland (US) LLP

(57) ABSTRACT

In a device and method for taking temperature readings on an HVAC system, a first probe is connectable in thermal communication with the HVAC system for taking a first temperature reading thereof. A second probe is connectable in thermal communication with the HVAC system for taking a second temperature reading thereof that is independent of the first temperature reading. A digital display is connectable to the first and second probes for displaying the first and second temperature readings.

21 Claims, 4 Drawing Sheets

(56) References Cited

U.S. PATENT DOCUMENTS

| | | | |
|---|---|---|---|
| 5,311,745 A | 5/1994 | Lockhart et al. | |
| 5,317,903 A * | 6/1994 | McClelland | F25B 45/00 |
| | | | 62/149 |
| 5,539,674 A | 7/1996 | Barbier et al. | |
| 6,334,320 B1 | 1/2002 | Brown et al. | |
| 6,742,349 B1 | 6/2004 | Kawai et al. | |
| 6,986,469 B2 | 1/2006 | Gauthier et al. | |
| 7,437,941 B1 | 10/2008 | Ward | |
| 7,469,591 B1 | 12/2008 | Chuang | |
| 7,685,882 B1 | 3/2010 | Ward | |
| 7,830,110 B1 | 11/2010 | Kuelbs | |
| 8,069,731 B2 | 12/2011 | Ward | |
| 2002/0112490 A1 | 8/2002 | Gong | |
| 2007/0205296 A1 | 9/2007 | Bell et al. | |
| 2008/0151965 A1 | 6/2008 | Kim | |
| 2008/0163629 A1 | 7/2008 | Chen | |
| 2008/0294274 A1 | 11/2008 | Laberge et al. | |
| 2009/0262782 A1 | 10/2009 | Ko et al. | |
| 2010/0162822 A1 | 7/2010 | Ward | |
| 2012/0240684 A1 * | 9/2012 | Alfano | G01L 19/12 |
| | | | 73/714 |
| 2012/0240685 A1 * | 9/2012 | Alfano | G01L 19/10 |
| | | | 73/727 |
| 2012/0241018 A1 | 9/2012 | Alfano | |

OTHER PUBLICATIONS

Weiss Instruments Vari-angle Digital Thermometers product bulletin, © 2001, Weiss Instruments, Inc., Holtsville, NY.

Digi-Cool Industries Ltd. Digital Refrigeration System Analyzer, AK900 User Manual, v. 1.04, Digi-Cool Industries Ltd., Duncan, BC, Canada.

* cited by examiner

DEVICE AND METHOD FOR TAKING MULTIPLE TEMPERATURE HVAC READINGS

CROSS-REFERENCE TO RELATED APPLICATIONS

This patent application is a continuation application of U.S. application Ser. No. 13/426,523, filed Mar. 21, 2012, titled "Device and Method for Taking Multiple Temperature HVAC Readings", which claims benefit under 35 U.S.C. § 119(e) to U.S. provisional application Ser. No. 61/454,918, filed Mar. 21, 2011, titled "Device and Method for Taking Dual Temperature HVAC Readings", both of which are hereby expressly incorporated by reference as part of the present disclosure. Furthermore, this application contains related subject matter as co-filed application entitled "Gauge Protector" filed on Mar. 21, 2012, claiming benefit under 35 U.S.C. § 119(e) to U.S. provisional application Ser. No. 61/454,925, filed on Mar. 21, 2011, which is also hereby expressly incorporated by reference as part of the present disclosure.

FIELD OF THE INVENTION

The present invention relates to devices and methods for temperature measurement, and more particularly, to devices and methods for taking dual temperature readings on heating, ventilating and/or air conditioning ("HVAC") systems, such as refrigeration systems.

BACKGROUND INFORMATION

HVAC technicians typically need to take two temperature readings on an HVAC system, such as a refrigeration system. In some instances this can require the technician to bring a separate tool, or multiple devices. In other instances the technician is unable to take the two temperature readings simultaneously. In still other instances this procedure is more time consuming and/or requires more effort than otherwise desired.

Accordingly, it is an object of the present invention to overcome one or more of the above-described drawbacks and/or disadvantages of the prior art.

SUMMARY OF THE INVENTION

In accordance with a first aspect, a device for taking temperature readings on an HVAC system comprises a first probe connectable in thermal communication with the HVAC system or otherwise configured for taking a first temperature reading thereof; a second probe connectable in thermal communication with the HVAC system or otherwise configured for taking a second temperature reading thereof; and at least one display connectable in signal communication to the first and second probes for displaying the first and second temperature readings. The device may include additional probes to obtain additional temperature readings displayable on the display(s).

In some embodiments, each probe is a k-type probe. The probes and the device can be configured to take the multiple temperature readings substantially simultaneously, and/or the display substantially simultaneously displays the temperature readings.

Some embodiments further include a manifold attachable to the HVAC system, and including the device mounted thereon. In some such embodiments, the manifold includes one or more gauges, and the display is mounted between the gauges. In some such embodiments, the gauges are analog, and the display is digital. The probes extend outwardly from the manifold and/or device and are receivable within or connectable to the HVAC system for taking the temperature readings.

Some embodiments further include at least one sealing member, such as a valve or other flow control device, for forming a fluid-tight seal between the manifold and the HVAC system. In some such embodiments, the manifold further includes a torque-limiting handle that securely closes and forms a fluid tight seal between the sealing member and HVAC system, but substantially prevents damage to the sealing member by over-tightening.

In some embodiments, the display is (i) fixedly secured in a region of the manifold, e.g., a central region, and substantially simultaneously displays the various temperature readings, and/or (ii) is attachable to said region of the manifold and substantially simultaneously displays the readings. In some such embodiments, the display is both attachable to and detachable from the manifold.

In some embodiments, the device includes at least one fastener or attaching mechanism for attaching the display to the HVAC manifold. In some such embodiments, a fastener: (i) is c-shaped or otherwise defines a hook shape for engaging and attaching the display to the HVAC manifold; (ii) snap fits to the HVAC manifold for engaging and attaching the display thereto; (iii) includes a clip for engaging and attaching the display to the HVAC manifold; and/or (iv) is attachable to a gauge cover for attaching the display to the HVAC manifold.

In some embodiments, the display generates color coded temperatures, and each color corresponds to a respective refrigerant type. In some embodiments, the device calculates and/or displays super-heated and sub-cooling refrigerant temperatures.

In some embodiments, the device is: (i) solar powered with battery backup, and/or (ii) full battery powered for low light environments. In some such embodiments, the device includes a solar array for solar powering the display and/or the probes.

In accordance with another aspect, a device for taking temperature readings on an HVAC system comprises first means connectable in thermal communication with the HVAC system or otherwise configured for taking a first temperature reading thereof; second means connectable in thermal communication with the HVAC system or otherwise configured for taking a second temperature reading thereof; and third means connectable in signal communication to the first and second means for displaying the first and second temperature readings. The device may include additional probes to obtain additional temperature readings displayable on the display(s).

In some embodiments, the first means is a first temperature probe, the second means is a second temperature probe, and the third means is a digital display. In some embodiments, the probes generate digital signals indicative of the respective temperature. In some embodiments, the first and second means substantially simultaneously take the first and second temperature readings, and/or the third means substantially simultaneously displays the first and second temperature readings.

In accordance with another aspect, the present invention is directed to a method comprising the following steps:
(i) connecting an HVAC manifold to an HVAC system;
(ii) taking a first temperature reading of the HVAC system;

(iii) taking a second temperature reading of the HVAC system; and (iv) displaying the first and second temperature readings on a display located on the HVAC manifold.

In some embodiments, the displaying step includes substantially simultaneously displaying the first and second temperature readings. Some embodiments further comprise taking the first and second temperature readings substantially simultaneously.

One advantage of the present invention is that it enables HVAC technicians to take multiple temperature readings on an HVAC system, such as a refrigeration system. Yet another advantage is that the present invention allows HVAC technicians to take such temperature readings without requiring the additional or separate tool(s) required by the prior art. Yet another advantage of the present invention is that it enables HVAC technicians to take the temperature readings simultaneously and/or to display the temperature readings simultaneously. A further advantage of the present invention is that it allows HVAC technicians to take multiple temperature readings on an HVAC system, such as a refrigeration system, in less time and/or with less effort than encountered in the prior art.

Other objects and advantages of the present invention and/or of the currently preferred embodiments thereof will become more readily apparent in view of the following detailed description and accompanying drawings.

DETAILED DESCRIPTION OF THE EMBODIMENTS OF THE INVENTION

Figure 1:
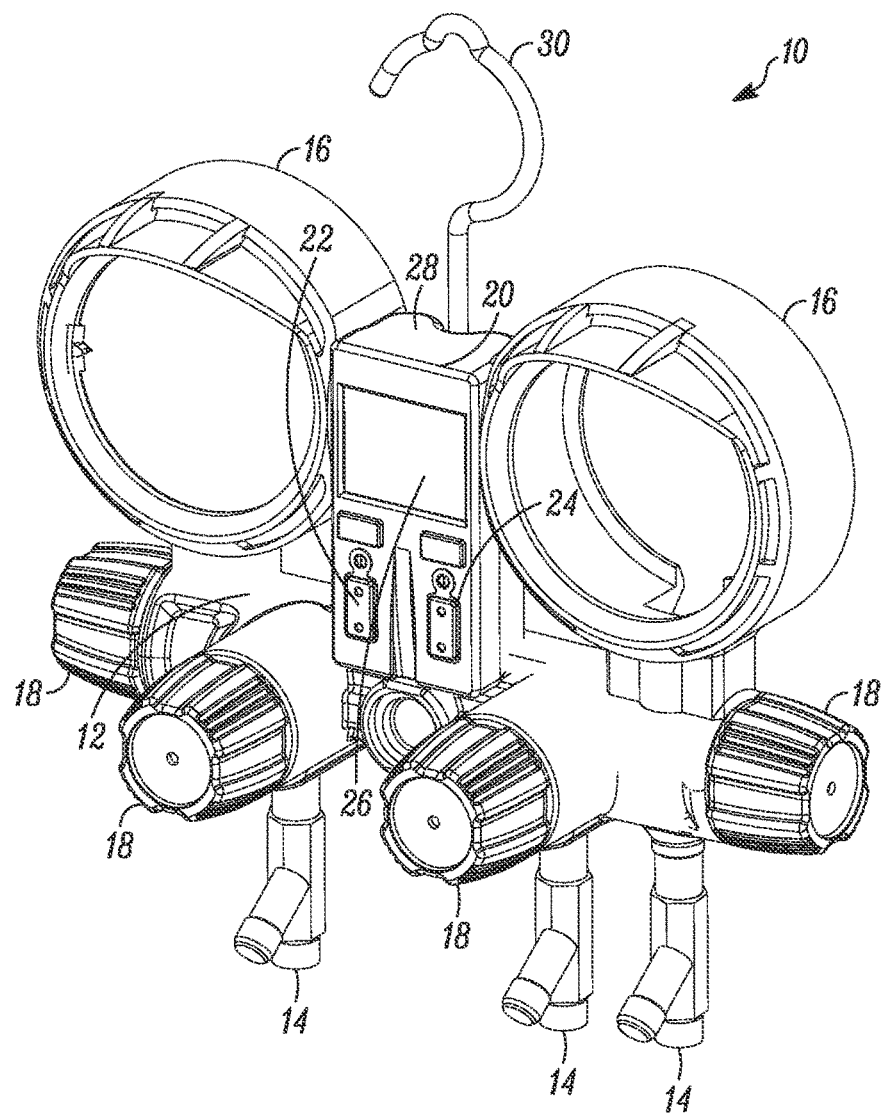
FIG. 1 is a perspective view of an HVAC manifold including a device for taking two temperature readings on an HVAC system, such as a refrigeration system, and displaying the two temperature readings.

In FIG. 1, an HVAC manifold and device for taking dual temperature readings embodying the present invention is indicated generally by the reference numeral 10. The device 10 includes an HVAC manifold 12, a plurality of probes 14 extending downwardly from the manifold that are received within a respective HVAC system, such as a refrigeration system, a pair of analog gauge receptacles 16 (the left of which contains a gauge, the right of which does not, embodiments of which are described in the above-referenced co-pending application entitled "Gauge Protector" filed on even date herewith), and a plurality of handles or knobs 18 for opening and closing respective valves (not shown) for connecting the manifold and gauges in fluid communication with the respective HVAC system. As should be understood, the gauges are for monitoring characteristics or physical properties of the respective HVAC system, such as pressure (e.g., refrigerant pressure). The handles/knobs 18 can be torque-limiting to form a secure fluid-tight seal between a respective sealing member (for example, a valve) and the HVAC system while substantially preventing damage to the sealing member by over-tightening.

A dual temperature device 20 is provided for taking multiple temperature readings on the HVAC system. The dual temperature device 20 includes a first female plug 22 for receiving a first temperature probe or sensor connectable in thermal communication with the HVAC system for taking a first temperature reading thereof; a second female plug 24 for a second temperature probe or sensor connectable in thermal communication with the HVAC system for taking a second temperature reading thereof; and a display 26 connected to the first and second temperature probes for displaying the first and second temperature readings. The first and second temperature readings are independent of each other and may be taken and displayed simultaneously, or not, as desired. In the illustrated embodiment, the display 26 is a LED display that can display the first and second temperature readings simultaneously thereon, such as in a side-by-side manner. The first and second temperature probes can be, for example, k-type thermocouples. However, as should be recognized by those of ordinary skill in the pertinent art based on the teachings herein, any of numerous different types of displays and temperature sensors or probes that are currently known, or that later become known, equally may be employed.

The digital display 26 is mounted in a central region of the manifold between the analog gauge receptacles 16, though it may be mounted elsewhere. A solar array 28 is mounted above the display 26 and between the analog gauge receptacles 16, and is electrically connected to a battery charger (not shown) to charge a battery (not shown) and thereby power the display and probes. However, the unit may be powered by any suitable mechanism. The battery can be charged, for example, conventionally using an electrical outlet and/or the device can include a non-rechargeable battery. The device may also be powered directly by an electrical outlet via a power cord and plug, optionally with, e.g., rechargeable or non-rechargeable battery for power backup and/or to illuminate the display 26 in low-light environments.

A hanger or hook 30 extends upwardly from the manifold for hanging the manifold and device during use and/or storage.

In FIGS. 2-4A, another HVAC manifold and device for taking dual temperature readings is indicated generally by the reference numeral 110. The manifold and device 110 is substantially similar to the device 10 described above with reference to FIG. 1, and therefore like reference numerals preceded by the numeral "1" are used to indicate like elements. A primary difference of the manifold and device 110 in comparison to the manifold and device 10 is that the dual temperature device 120 is removably attachable to the central region of the manifold for attaching the device to a conventional manifold, such as an analog gauge manifold. The dual temperature device 120 includes fasteners or attachment mechanism(s) for removably fastening the device to the manifold. In the embodiment of FIG. 4B, the fasteners 132 are spring-like c-clips that frictionally engage the central region of the manifold to releasably retain the display on the manifold. However, any suitable attachment mechanism(s) may be used. For example, instead of the described c-clips extending from the base of the device 120, the fasteners may be attached to and/or part of the device 120 such that the fastening mechanism is part of the enclosure of the device 120. For another example, one or more fasteners may be part of the back (the part facing and/or attaching to the manifold) of the device 120.

A pair of temperature sensor clamps 134, as are known, are attachable or attached to the distal ends of the probes 124. The sensors 124 are configured to connect to or with an HVAC system for taking the independent temperature readings.

Figure 2:
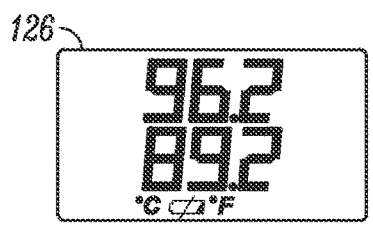
FIG. 2 is a front view of an LCD screen as used in a second embodiment.
Figure 4A:
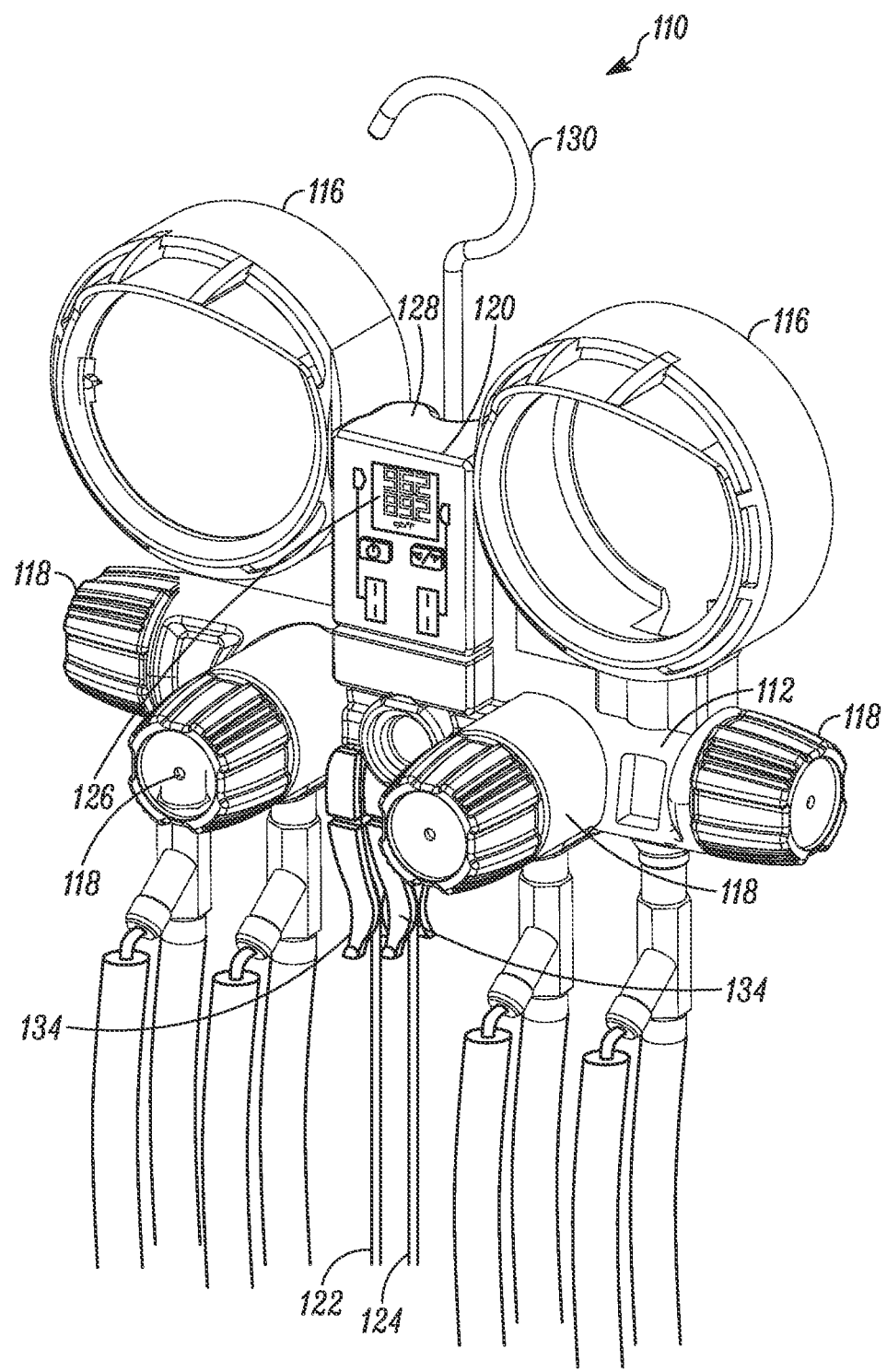
FIG. 4A is a perspective view of the device of FIG. 3 as attached to a manifold.
Figure 4B:
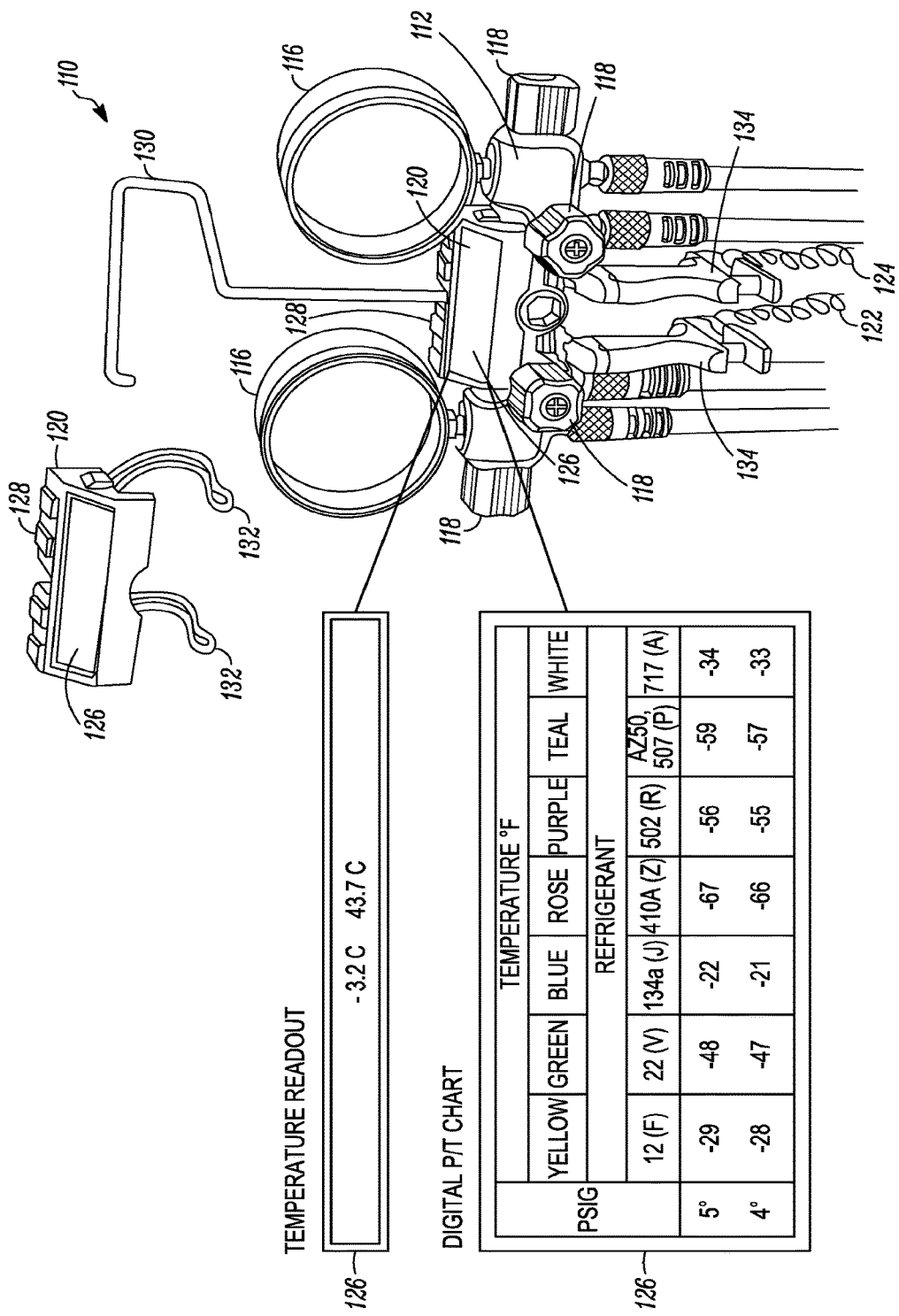
FIG. 4B is a schematic view of another embodiment of a multi-temperature detection device, showing the device attached to the manifold and separated from the manifold, and views of display features.

The display 126 can provide any of numerous different readouts, as shown in FIG. 4B. For example, the display can provide a temperature readout whereby the first and second temperature readings are displayed side by side. In addition, the display can provide a digital pressure and temperature chart for the different types of refrigerant including the color coding of the refrigerants. For example, as shown in FIG. 2, the display 126 is an LCD display screen used to display information. The LCD screen can display digital numerical read-outs, charts, graphs, and/or any other information that may be desirable for monitoring and/or measuring on a manifold system, as shown in FIG. 4B.

Figure 3:
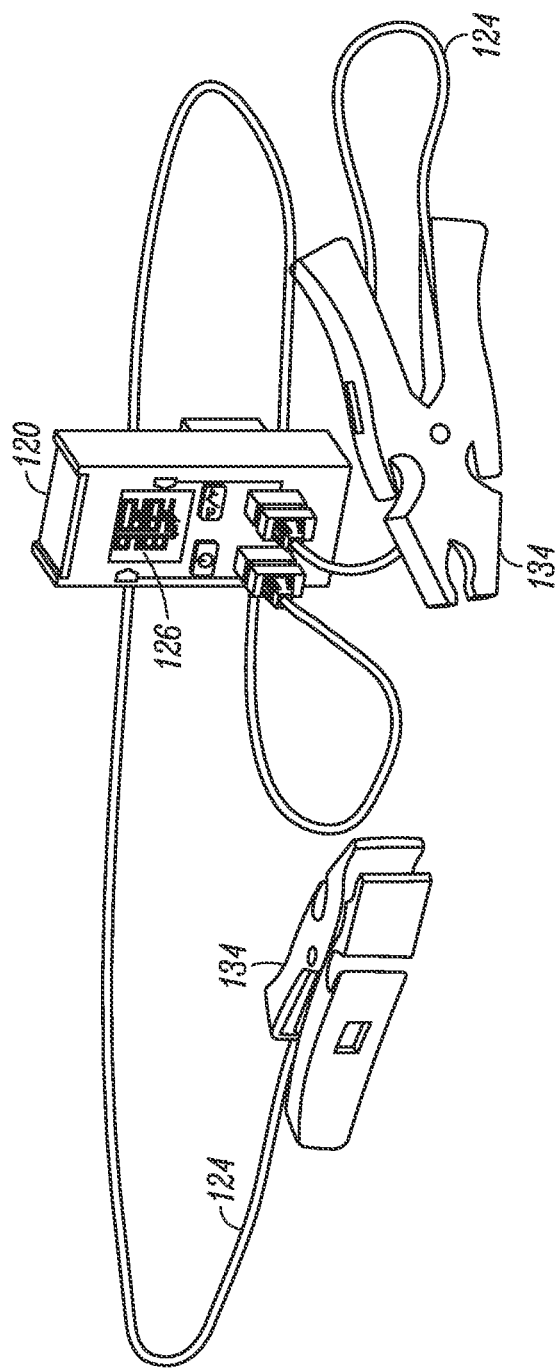
FIG. 3 is a perspective view of a removable digital temperature detect device in accordance with the second embodiment.

FIG. 3 shows the device 120 as separate from a manifold system. Device 120 is a removably attachable temperature detection device. A pair of temperature sensor clamps 134 are connected/connectable to the device 120 by sensors, probes, or leads 124. The sensor clamps 134 are configured to attach to a manifold or other part of the HVAC system to sense temperature and/or other characteristics. The display 126 of device 120 is used to display the measurements and/or readings of the sensed temperature and/or other characteristics, as desired.

FIG. 4A shows a perspective view of the temperature device 120 as attached to a manifold system. The sensor clamps 134 are held or supported on the manifold system, e.g., they are spring clamps, with sensors, probes, or leads 124 configured to electrically attach them in signal communication to the device 120. As shown, the device 120 is mounted between two analog gauge receptacles 116, but may be mounted anywhere on the manifold or not at all. As shown in FIG. 4A, the manifold and/or temperature detect device 120 includes a hanger 130. Further, as shown in FIG. 4A, the clamps 134 are mounted in a storage position, hanging from the device 120. However, any suitable means of storage may be used.

Surface 128 of the device 120 may be a solar array to power the device 120. The solar array 128 can power the display 126 and any computational and/or monitoring equipment of the device 120 or provide electrical power for other uses.

FIG. 4B shows a schematic view of another temperature device 120, showing the device attached to the manifold and also separated from the manifold. Further, FIG. 4B shows views of display features, such as a color coded display screen 126, that can output, as shown, temperature readings and charts. The display screen may also show graphs or other graphical and/or display information.

Also shown in FIG. 4B, the device 120 is separable from the manifold. The device 120 includes fasteners 132 for removably fastening the device 120 to the manifold. As shown, the fasteners 132 are c-clips that are configured to wrap around and/or clip onto the manifold structure. Although c-clips are shown, those skilled in the art should appreciate that other forms of fasteners or attachment means may be used to mount, attach, or fix the device 120 to the manifold.

As may be recognized by those of ordinary skill in the pertinent art based on the teachings herein, numerous changes and modifications may be made to the above-described and other embodiments of the present invention without departing from its scope as defined in the appended claims. For example, the dual temperature device may be used with any of numerous different types of HVAC manifolds that are currently known or that later become known, including, for example, manifolds with digital pressure or other types of gauges. In addition, the dual temperature device and/or temperature probes may be attachable to a manifold in any of numerous different ways that are currently known or later become known. For example, the device may snap fit to the HVAC manifold; the device may include one or more clips for engaging and attaching the display to the HVAC manifold, and/or the display may be attachable to a gauge cover for attaching the display to the HVAC manifold. Alternatively, the dual temperature device need not be attached to a manifold. Rather, the device may be used independent of a manifold. In addition, the device may include additional temperature sensors or probes, or otherwise may be used to generate more than two independent or other temperature readings, as will be appreciated by those of ordinary skill in the art. Accordingly, this detailed description of the embodiments is to be taken in an illustrative as opposed to a limiting sense.

What is claimed is:

1. An apparatus for taking temperature readings on an HVAC system, comprising:
    a temperature reading device for taking temperature readings on the HVAC system, comprising;
        a first female plug;
        a second female plug;
        a first probe removably coupled to the first female plug and connectable in thermal communication with the HVAC system for taking a first temperature reading thereof;
        a second probe removably coupled to the second female plug and connectable in thermal communication with the HVAC system for taking a second temperature reading thereof that is independent of the first temperature reading; and
    at least one display connectable to the first and second probes for displaying the first and second temperature readings.

2. The apparatus of claim 1, wherein the first probe comprises a first thermocouple and the second probe comprises a second thermocouple.

3. The apparatus of claim 1, wherein the first and second probes are configured to take the first and second temperature readings simultaneously and the display simultaneously displays the first and second temperature readings.

4. The apparatus of claim 1, wherein each of the first probe and the second probe comprises an electrical lead comprising a first end configured to be removably coupled to the corresponding first female plug and the second female plug and a distal second end comprising a temperature sensor for taking the temperature readings.

5. The apparatus of claim 1, wherein the display generates color-coded temperatures, and each color corresponds to a respective refrigerant type.

6. The apparatus of claim 1, wherein the temperature reading device calculates super-heated and sub-cooling refrigerant temperatures.

7. The apparatus of claim 1, wherein the temperature reading device is configured to be at least one of: (i) solar powered with battery backup, and (ii) fully battery powered for low light environments.

8. The apparatus of claim 1, wherein the temperature reading device further comprises a solar array for solar powering the display and/or the first probe and the second probes.

9. The apparatus of claim 1, further comprising a manifold attachable to the HVAC system and comprising at least one analog gauge, wherein the temperature reading device is mounted on the manifold.

10. The apparatus of claim 9, wherein the display is (i) fixedly secured in a central region of the manifold and simultaneously displays the first temperature reading and the second temperature reading or (ii) is removably attachable to a central region of the manifold and simultaneously displays the first temperature reading and the second temperature reading.

11. The apparatus of claim 9, wherein the manifold comprises a first gauge and a second gauge, wherein the display is mounted between the first gauge and the second gauge.

12. The apparatus of claim 11, further comprising a first gauge receptacle extending up from the manifold and a second gauge receptacle extending up from the manifold, wherein the first gauge is disposed within the first gauge receptacle and the second gauge is disposed within the second gauge receptacle and wherein the first gauge and the second gauge are analog, and the display is digital.

13. The apparatus of claim 9, further comprising at least one sealing member for forming a fluid-tight seal between the manifold and the HVAC system.

14. The apparatus of claim 13, wherein the manifold further comprises a torque limiting handle that closes and forms a fluid tight seal between the sealing member and the HVAC system.

15. The apparatus of claim 9, wherein the temperature reading device includes at least one fastener for attaching the temperature reading device to the manifold.

16. The apparatus of claim 15, wherein the fastener is at least one of: (i) is hook shaped for engaging and attaching the temperature reading device to the manifold; (ii) snap fits to the manifold for engaging and attaching the temperature reading device thereto; (iii) a clip for engaging and attaching the temperature reading device to the manifold; and (iv) attachable to a gauge cover for attaching the temperature reading device to the manifold.

17. An apparatus for taking temperature readings on an HVAC system, comprising:
a temperature reading device for taking temperature readings on the HVAC system comprising:
a first female plug;
a second female plug;
a first means for sensing a first temperature removably coupled to the first female plug and configured to be connectable in thermal communication with the HVAC system for sensing a first temperature reading thereof;
a second means for sensing a second temperature removably coupled to the second female plug and configured to be connectable in thermal communication with the HVAC system for sensing a second temperature reading thereof that is independent of the first temperature reading; and
a third means for displaying communicatively coupled to the first means for sensing a first temperature and second means for sensing a second temperature for displaying the first temperature reading and the second temperature reading.

18. The apparatus of claim 17, wherein at the first and second means simultaneously take the first temperature reading and the second temperature reading.

19. The apparatus of claim 17, wherein the third means simultaneously displays the first temperature reading and the second temperature reading.

20. The apparatus of claim 17, wherein the first means is a first temperature sensing probe, the second means is a second temperature sensing probe, and the third means is a digital display.

21. The apparatus of claim 20, wherein the first temperature sensing probe and the second temperature sensing probe each generates digital signals indicative of the respective first temperature and the second temperature.

* * * * *